United States Patent

Aspden

[11] Patent Number: 5,734,122
[45] Date of Patent: Mar. 31, 1998

[54] THERMOELECTRIC ENERGY CONVERSION APPARATUS

[76] Inventor: Harold Aspden, Acres High, Hadrian Way, Southhampton SO16 7HZ, England

[21] Appl. No.: 520,008

[22] Filed: Aug. 23, 1995

Related U.S. Application Data

[63] Continuation-in-part of PCT/US94/05797, May 23, 1994, continuation-in-part of Ser. No. 191,381, Feb. 3, 1994, abandoned, which is a continuation of Ser. No. 480,816, Feb. 16, 1990, abandoned.

[30] Foreign Application Priority Data

Apr. 15, 1989 [GB] United Kingdom ............... 8908571
May 25, 1993 [GB] United Kingdom ............... 9310734

[51] Int. Cl.$^6$ ................................................ H01L 35/30
[52] U.S. Cl. .................... 136/205; 136/224; 136/225; 136/228; 310/306
[58] Field of Search ................. 136/200, 205, 136/224, 225, 228; 310/306

[56] References Cited

U.S. PATENT DOCUMENTS

| | | | |
|---|---|---|---|
| 375,408 | 12/1887 | Acheson | 310/306 |
| 407,762 | 7/1889 | Acheson | 310/306 |
| 407,763 | 7/1889 | Acheson | 310/306 |
| 2,619,603 | 11/1952 | Chilowsky | 310/4 |
| 2,637,823 | 5/1953 | Anderson et al. | 310/4 |
| 2,919,356 | 12/1959 | Fry | 310/4 |
| 3,154,927 | 11/1964 | Simon | 62/3 |
| 3,310,689 | 3/1967 | Heinmets | 310/4 |
| 3,593,047 | 7/1971 | Nolta et al. | 310/4 |
| 4,435,663 | 3/1984 | Gambinom et al. | 310/306 |
| 5,065,085 | 11/1991 | Aspden et al. | 322/2 R |
| 5,288,336 | 2/1994 | Strachan et al. | 136/200 |
| 5,376,184 | 12/1994 | Aspden | 136/203 |

Primary Examiner—Kathryn L. Gorgos
Assistant Examiner—Chrisman D. Carroll

[57] ABSTRACT

Apparatus is disclosed in which a pair of elongated solid cylindrical metal conductors mounted with their central axes mutually parallel are connected at their ends to form a closed electrical circuit path, there being heat sinks at spaced positions along their length which serve as heat transfer means setting up a temperature gradient along the lengths of the conductors. A strong electrical current flow in the conductors creates a circumferential magnetic field in the metal directed at right angles to the heat flow and this, by the Nernst Effect, produces a radial electric field gradient in the metal coupled with the transient accumulation of stored electrical energy. The apparatus disclosed serves for the experimental testing of energy conversion and storage by thermoelectric processes occurring in the metal and the ultimate utilization of the technology involved.

6 Claims, 2 Drawing Sheets

THERMOELECTRIC ENERGY CONVERSION APPARATUS

CONTINUATION RELATIONSHIPS

This application is a continuation-in-part of PCT/US94/05797, filed 23 May 1994 and U.S. patent application Ser. No. 08/191,381, filed 3 Feb. 1994, now abandoned, which is a continuation of U.S. patent application Ser. No. 07/480,816, filed 16 Feb. 1990, now abandoned.

FIELD OF INVENTION

The invention relates to energy conversion apparatus in which electric field effects are produced in an electrical conductor by the combined action of a magnetic field and heat flow. The magnetic field is produced by electrical current flow in the body of that conductor and the field of invention is therefore essentially in the discipline of thermoelectricity, notably involving the Nernst Effect, which relates temperature gradient, magnetic field and a mutually orthogonal induced electric field powered by the heat resource. The research on which the invention is based has demonstrated certain energy anomalies some of which are not yet well understood, but which involve apparatus having general design features based on sound and well understood scientific principles.

The invention is only concerned with specific novel and non-obvious features of apparatus to be utilized in the onward experimental research and the eventual technological applications which can exploit these energy anomalies.

This application is filed as a continuation-in-part deriving from U.S. patent application Ser. No. 08/191,381 because the apparatus as described in the specification of that application and its original counterpart U.S. patent application Ser. No. 07/480,816 was presented in the context of its suggested relevance to what has come to be termed 'cold fusion' and it is expressly affirmed that, though the conception of this invention may owe its origin to inspiration connected with that theme, this subject continuation-in-part application application makes no claim dependent upon 'cold fusion'.

The invention concerns electrical apparatus aimed specifically at setting up an orthogonal interaction between a magnetic field and a temperature gradient in an electrical conductor, ostensibly for no apparent purpose since this involves power loss. However, by the Nernst Effect, there is then an electric field set up in the conductor in the mutually orthogonal direction and the consequences of this in the apparatus configuration of this invention are a basic research pursuit concerning a certain energy anomaly which gives the invention utility at least as experimental apparatus.

However, notwithstanding the fact that the claims of this specification are not specific to the 'cold fusion' theme, this should not be regarded as a disclaimer of rights should what has come to be known as 'cold fusion' eventually develop as a specific application of the apparatus covered by the claims.

As support justifying this statement and as a matter of documentary record, but without it being part of the detailed patent description needed to support the claims, a commentary is added at the end of this specification as an 'Appendix' aimed at providing some general scientific background. The text of this Appendix was written in October 1993 with the intention of using it as a scientific statement to support a petition to revive the parent U.S. patent application No. 07/480,816, it having been deemed abandoned owing to the Applicant's non-response to an Examiner's communication dated Dec. 16th, 1992. The latter was presumably lost in the Christmas mail load as it was never received by the Applicant in U.K. The appended commentary has not hitherto been disclosed and so cannot be quoted by way of reference to a scientific publication of record.

BACKGROUND OF THE INVENTION

There are in electrical science a number of energy anomalies which are seldom recognized in modern teaching but which ultimately will be resolved and have technological spin-off with patentable merit.

The primary example known to this Applicant is the subject of his own Ph.D. research, which dates from the 1950–1953 period. In electrical sheet steel as used in power transformers the eddy-current losses are known to exceed the basic theoretical design expectation by a factor which can be 50% in thick laminations but much higher, even as high as a ten-fold increase, in thin cold-reduced grain-oriented laminations magnetized at 90° to the rolling direction. More familiar values are loss factors of 2 or 3.

As noted in this Applicant's published scientific papers on the subject in the 1950 era, for those materials which overall had an anomaly loss factor of 2, research revealed that much of this rate of loss occurred over the low flux density range in a B–H magnetization cycle which operated between high flux densities.

Although the Applicant researched numerous aspects of how the loss could be affected, as by mechanical stress, excitation waveform distortion, d.c. polarization bias and especially loss rate factor at progressive stages around the B–H magnetization loop, the outcome of that research did not reveal a satisfactory final account of the hidden mysteries implicit in the loss mechanism. Indeed, the subject has subsequently become dormant and is now virtually forgotten, as electrical engineers avoid the underlying theory and take manufacturer's specifications of empirical loss properties as their input data for computer design analysis structured on standard theory.

This introduction is relevant because the Applicant has recently come to realise why those losses in electrical sheet steels are enhanced and the reason, seen now in retrospect, is quite simple. Furthermore, there are certain new technological implications extending to the field of the subject invention.

Hysteresis and eddy-current losses produce heat. The heat must flow from the electrical sheet steel lamination and it tends to flow laterally in the plane of the lamination in its width direction to find the shortest route to the ambient cooling medium, whether that be air or oil. The laminations, if thin enough, of the order of 200 microns, and if of good electrical steel quality with large crystals, will have in those crystals what are known as magnetic domains. These are regions of the order of 100 microns across in which the steel is magnetized to saturation in one of three mutually orthogonal axial directions fixed by the body-centred crystal structure in iron. Now, when heat flows crosswise to a strong magnetic field, we know from our knowledge of thermoelectricity that it results in an electric field set up in the mutually orthogonal direction. This is the Nernst Effect and it really amounts to there being a magnetic deflection of the flow of electrical charge in its collisional activity as the transporter of heat. What happens is that the thermal motion is deflected sideways so that the heat flow is arrested by the charge stacking up at the side surfaces of the lamination to set up the electric field. Heat energy is converted into electrical energy and the magnetic field merely serves as a catalyst, acting to divert charge in motion by a well-known force law named after Lorentz. The charge is that of the heat carriers, the free electrons inside the iron.

To explain how this accounts for the eddy-current loss anomaly, one only needs then to realise that the heat will flow one way in the laminations through a succession of magnetic domains and the circuital eddy-currents induced by a.c. magnetization will cross from being adjacent one surface of the lamination to the other and so along the same transverse track as the induced electric field. The direction of polarization of a magnetic domain will determine whether an opposing or assisting electric field is provided by that Nernst Effect, but the current flow will always take the path of least resistance, meaning that it will opt for passage through the domain offering the assisting field. In short, owing to the conversion of the heat into electricity, there is an aiding EMF in the eddy-current circuital flow and this means that much higher currents will flow than are expected from basic theory. In turn, though this has involved cooling as energy is converted from heat into electricity, this electricity then adds to the eddy-current strength and regenerates heat, more heat than is expected from theory which ignores the Nernst Effect and that means an anomalous loss.

Of course, when the lamination is strongly magnetized so that the polarization of all magnetic domains tends to be in the same general direction, then the current loses its optional path and what it gains near one edge in making the traversal of the width of the laimination it loses at the other edge. The result is that the loss anomaly factor is quite small and indeed normal and close to theoretical prediction, being merely affected by structural inhomogeneities at the higher range of the B–H flux loop, as this Applicant's Ph. D. experimental research established.

The above is an example of a hitherto unexplained heat generation anomaly, important because it affects all electrical power apparatus using electrical sheet steel, which means virtually all motors and transformers and yet one which few scientists even know exists.

In this case, however, the thermal processes affected by magnetism convert heat into electricity in such a way that more heat is generated than is expected but it all is accounted for as input electricity and, though they have not understood the science involved, our scientists have given up and accepted the loss situation without explanation. It is only now, by chance, and arising from other research connected with this invention, that this Applicant has discovered the true explanation.

This further research was concerned with conversion of heat into electricity using intrinsically magnetized materials, typically nickel, in structures which were the subject of U.S. Pat. Nos. 5,065,085, 5,288,336 and 5,376,184. In this research it was realised that when heat flows in nickel laminations and is diverted at a kHz frequency within that metal by a magnetic field so as to set up EMFs in the transverse sense and through a laminar capacitor stack built from those laminations, so one can take electrical power from the structure. It sustains oscillations by developing a negative resistance powered by heat input. This utilizes the Nernst Effect primarily and certain other thermoelectric effects for functional design reasons, but is a surprising development because one is not familiar with the role of magnetism as a catalyst in converting heat into electricity. Yet, in power technology in the 1960s, before it was pushed aside by the advent of nuclear power there was a new technology for generating electrical power developing known as magneto-hydrodynamics (MHD) by which hot ionised gases passing through a magnetic field which diverted positive and negative ions in opposite transverse directions shed heat to produce that electrical power. The magnetic field was a mere catalyst but note that the heat was flowing as part of a moving electrically conductive medium, in that ease a gas.

The three U.S. Patents just mentioned describe devices in which the heat to electricity conversion occurs within metal and, of course, one might then wonder if liquid electrolytes can offer prospect of a similar power conversion. Now, it is important to understand that, though we tend to believe otherwise, it is a scientific fact, known at least to those who really understand the operation of wave guides and reflective properties of surfaces, that a metal has what one can term a dielectric constant and an electric field gradient can exist in the body of a metal.

This brings us to another form of energy loss recently encountered in experimental electric motor research by this Applicant, but in this case what one sees, at least over a period of motor start-up, is a net energy loss drawn from an input source but no apparent destiny for the energy as output.

In a university research project in 1984 the Applicant investigated the effect of spinning a solid nylon cylinder mounted on a steel shaft and enclosed except at its ends in a surrounding cylindrical electrode, there being some 20,000 volts d.c. potential applied between the shaft and the electrode. The object of that research was to verify a theoretical prediction that a radial electric field could set up an electrical displacement partially in the nylon owing to its high dielectric constant and partially also in the underlying coextensive vacuum field medium. The latter is that associated with the displacement currents implicit in Maxwell's equations in electromagnetic theory. The theory researched by the Applicant affirmed that there would be a reaction in the form of a field energy spin which would store energy and which might be recoverable by inertial interaction.

The test rig had facilities for declutching the driving motor and allowing the slow spin-down of the nylon rotor to be timed to trace a connection with the level and duration of the voltage priming the action. In the event, the results did not meet expectation. If there was a 'vacuum spin' set up, it had no evident mechanical coupling with the nylon rotor.

Much later it was realised that the tests should have been performed using a metal rotor, even though only a very small radial electric field gradient could be set up in such a test apparatus. The point here is that electric charge displacement within the metal will promote a counterpart displacement in the underlying vacuum field medium and the charge would separate to form a surface charge of one polarity and a distributed internal charge of opposite polarity. By the principles of electrostatics, in a hollow and even in a solid metal conductor, the surface charge develops no back reaction field inside that conductor, and so any setting up of a radial electric field gradient within that metal rotor would transfer electrons to cause displaced charge of one polarity to be balanced at the surface by vacuum field displacement charge. The result is that charge of opposite polarity is held neutralized in the body of the metal by vacuum field displacement charge of the other polarity. The expectation was that so long as the small radial EMF was maintained a quite significant current might flow to build-up more and more displaced charge which would defy detection by electrical sensing, but which would involve storage of energy by 'vacuum spin inertia' and energy could, possibly, be tapped by somehow reversing the radial EMF.

Though this was seemingly a speculative proposition, the underlying theory had recognized that a great deal of cosmology was connected with energy storage by rotation and its origin could best be linked with the setting up of radial electrical fields. An example here is the creation of a star by nucleation of protons preferentially in a neutral proton-electron plasma, compared with the electrons, owing to their stronger mutual gravitational attraction.

It was from this basis that the Applicant was able to understand something that emerged whilst testing a new kind of electric motor having axially mounted magnets in its rotor. This motor has become the subject of a pending GB. Patent Application No. 9,513,855 filed on Jul. 7, 1995 (later published as GB 2,303,255A). The corresponding U.S. patent application is Ser. No. 08/579,991 filed on Dec. 28, 1995, now abandoned.

When a magnet is rotated about its axis with its field penetrating a conductive rotor disc there is, as is well known from Michael Faraday's research, the induction of a radial EMF in that disc. This is what is needed to set up that 'vacuum field spin' condition which the Applicant had tried to trace in his earlier research. The test apparatus in this case included an electrical tachometer coupled to the rotor and affording a direct measure of the speed as well as an electrical d.c. drive motor powered by a stabilized voltage supply. The voltage and current were measured, the current being the variable as the motor gained speed. What was then noticed was that the particular apparatus tested could achieve a steady running speed in a few seconds but that the current input surge to the d.c. motor would reduce to its steady state value only over a much longer time period with a decay time constant of two or three minutes. This meant that there was an input of energy which was related to the speed-up process but which did not correspond to the mechanical machine requirements for that speed. Any transient electrical power effect would be expected to be of a thermal nature affecting motor resistance, but that should have implied a decreasing speed accompanying the smaller current, given that the supply voltage was steady.

It was concluded from such tests that a motor system including axially mounted magnets in its rotor structure, given an electrically conductive rotor, has an affinity on initial start-up for an excess input of energy which seems to be of inertial character but which is not the energy of the normal rotor inertia. An estimate from one set of tests suggested that the extra energy input could be as much as 20 times that needed to spin the motor inertially at the test speed. This has, of course, no practical significance unless one can find a way of recovering that energy, which is a subject now being pursued separately by the Applicant.

In the above background summary, however, a case has been set forth that shows how charge can be held effectively neutralized in a metal by the vacuum field electric charge displacement seated in that metal and how energy can be lost or stored anomalously by setting up a radial electric field in metal of cylindrical form. Also it has been explained how magnetic fields can develop electrical fields powered by heat. This background introduces the subject invention, which has the object of providing a particular form of non-rotating apparatus which is specially designed to set up anomalous energy effects based on the radial electric field in a metal conductor of circular cross-section.

BRIEF STATEMENT OF INVENTION

The object of the invention is to provide thermoelectric energy conversion apparatus specifically suited to the experimental testing of the interaction between thermal temperature gradients and the tranversely directed circumferential magnetic fields developed by electrical current flow along the length of a metal conductor as they combine to develop an electric displacement field radial to the conductor axis. To the extent that the latter electrical displacement induces reactions which build-up a sustained ionic charge polarization in the metal, as neutralized by that displacement, the latter deriving energy from the partial arrest of the heat carriers in the metal, it is a further object of the invention to provide the means for controlling the release of that energy in a useful way.

According to the invention, thermoelectric energy conversion apparatus comprises (a) mutually parallel elongated cylindrical metal conductors disposed side by side with short bridging connecting conductor links at their ends so as to form a closed circuital loop, (b) a source of electrical input power and circuit control means for regulating the power delivered by the source to develop an a.c. voltage at a frequency less than 5 Hz, (c) an electrical transformer disposed between adjacent ends of the elongated conductors, the transformer having a primary winding connected to receive the power delivered and transform it into current in said metal conductors which are arranged to form the circuital loop as a secondary winding on the transformer, the connecting conductor link at the transformer position passing through the ferromagnetic core aperture so as to constitute a segment of the secondary winding, and (d) two sets of heat sinks in thermal contact with the conductors at different positions along their length, with associated thermal transfer means for delivering and deploying heat, one set of heat sinks serving as a heat input source and one set serving as a heat output source, the a.c. current induced in the closed circuital loop being confined to passage through the elongated cylindrical metal conductors so as to develop a circumferential magnetic field about the conductor axis which interacts with heat flow along that axis to develop in turn an electric field within the conductor directed radially with respect to that axis.

According to a feature of the invention, in the apparatus there are only two elongated metal conductors connected by two bridging connecting conductor links to form a loop which is a single turn secondary winding on said transformer.

According to another feature of the invention, the elongated metal conductors are all of equal diameter and so equal cross-sectional area.

According to yet another feature of the invention, in the apparatus the circuit control means for regulating the power delivered by the source to develop an a.c. voltage at a frequency less than 5 Hz includes electronic power control circuit components which control the voltage waveform supplied to the transformer in an asymmetrical manner in which the voltage is lower and of longer duration in one polarity direction and higher but of shorter duration in the opposite polarity direction.

According to another feature of the invention, the apparatus includes two transformers aiding one another in powering the current flow in the conductor loop, these being toroidal transformers, one having a said bridging connecting conductor link passing through the central aperture of its toroidal core and the other having the other bridging connecting conductor link similarly passing through its central toroidial core aperture.

According to another feature of the invention, the elongated cylindrical metal conductors are enclosed in thermal insulation along their lengths between the heat sinks in order to confine heat flow to passage in an axial direction along the conductors.

In one prospective application of the apparatus provided by this invention at least one of the elongated cylindrical conductors is immersed in a liquid electrolyte and forms a cathode in a circuit arranged to be supplied with d.c. power, there being a cylindrical anode and the elongated cathode conductor being located along the central axis of the cylindrical anode, whereby the electrolyte itself forms a moderately conductive medium subjected to d.c. radial electric field action but has negligible conductance relative to that of the elongated cathode conductor powered by the transformer.

DETAILED DESCRIPTION OF THE INVENTION

Figure 1:
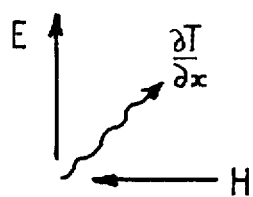
FIG. 1 depicts the mutually orthogonal relationship between a heat flow in a conductive medium, a magnetic field and a resulting electric field powered by that heat flow.

When a thermal gradient represented in FIG. 1 by $\delta T/\delta x$ is set up in the x direction of an x, y, z coordinate system and there is a magnetic field H in the y direction, there is, within an electrically conductive medium, a resulting electric field E set up in the z direction. T is temperature. The magnitude of the field E depends upon the intrinsic properties of the medium with the field polarity depending upon the type of charge carriers conveying the heat, but the relationship $$E = N_c H \delta T/\delta x$$

applies, where $N_c$ is an applicable coefficient, it being connected with the name Nernst as far as concerns metal conductors.

Typically, E can be several volts per cm in a strong field of the order of one Tesla with $\delta T/\delta x$ as one degree C. per cm. In practice, however, the problem is that of setting up such a temperature gradient in a metal conductor and finding a convenient way in which to apply a strong magnetic field. Then there is the problem of deciding how to harness the electric field, because if it is used to supply electric power through a connected circuit, that circuit affects the heat flow path adversely and thwarts one's efforts to convert heat into electricity.

This invention aims at providing an ingenious route by which seek to exploit this source of energy.

Figure 2:
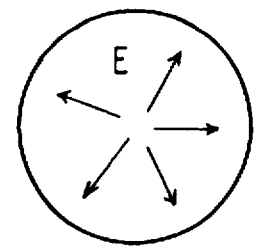
FIG. 2 shows the cross-section of a cylindrical conductor in which a radial electric field is set up by the interaction of current and heat in passage axially through the conductor, it being noted that such current develops a circumferentially directed magnetic field.

The underlying concept is that if a solid cylindrical conductor carries a very strong current it will develop a strong circumferential magnetic field, particularly if it comprises nickel or iron. Then, given heat flow along that conductor, the radial electric field shown in FIG. 2 will develop. Of itself this may seem to be inconsequential, a condition sustained after an initial transient and deploying heat energy into electrical form only in measure related to the electrostatic charge energy stored by that E field. In a metal conductor this is something that most scientists would discount from warranting consideration.

Figure 3:
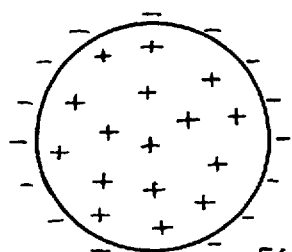
FIG. 3 shows how electric charge, displaced radially in a cylindrical conductor can accumulate at the boundary surface of the conductor whilst compensating electric charge, has a distribution within the conductor corresponding to the electric potential sustained by the combined effect of heat and current flow.

However, assuming the magnetic field and the heat flow are sustained, that E field in a metal conductor means that electric current must flow, a very high current density even with a very low E field, and if there is no good conductor path to take current away from the surface of the conductor there will be a build-up of charge, eg. the negative charge depicted in FIG. 3, whilst a compensating distributed positive charge is set up in the body of the conductor. Note that if charge cannot flow out then, even though the conductor has a point of connection to an external circuit, there can be no inflow of charge either, because a balance has to prevail.

Figure 4:
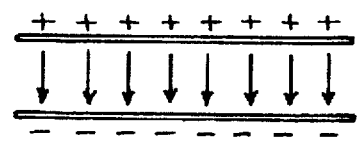
FIG. 4 shows a contrasting situation where a parallel plate capacitor-type arrangement has charge displaced within the medium separating the plates so as to build charge distributions adjacent both plates, but with no intervening charge distribution.

However, as the heat flows relentlessly through the conductor and the magnetic field is maintained, so the electric field persists in urging charge displacement. Now, in FIG. 4 we see what happens in a parallel plate capacitor when there is charge of opposite polarity on its separate plates. There is electric displacement even in the vacuum medium permeating the dielectric substance in the intervening space. The Maxwell charge displacement is a transfer of charge in that vacuum medium with some also in the dielectric from positions adjacent one plate to positions adjacent the other. However, there is no distributed charge in that intervening space, because the parallel plate geometry sets up the uniformity of field gradient that implies no intervening charge sources.

This is not the case with the radial electric field conditions set up in the cylindrical conductor. For uniform heat flow across the cross-section and uniform current distribution, the magnetic field H increases linearly with radial distance from the central axis and so the field E must share that same relationship. It can only do this if there is a uniform distribution of charge, a uniform charge density, within the conductor. Here, then, with this unusual combination of heat flow and electric current in a solid metal conductor we have the most unusual condition of a build-up of charge inside the body of that metal. As with the situation in the dielectric between the plates of the capacitor, there has to be accompanying displacement of charge in the vacuum field medium, but any charge displaced to the perimeter surface of the conductor sets up no back-field, by the well known principles of electrostatics, so the charge of opposite polarity to that displaced to the surface region takes up positions where it can neutralize any onward build-up of charge by displacement in the metal.

This process occurs without any evident sign of its action and is a self-regulating process because any deployment of heat in setting up this neutralized charge system can only promote underlying field turbulence of some kind which sheds heat energy back again as instability sets in.

However, in looking deeper into the physics involved here, this Applicant has noted certain phenomena connected with quantum theory which imply linear harmonic properties of the vacuum field medium, suggestive of harmonious and synchronized jitter-type motion of charge seated in the vacuum. This action is connected with the Heisenberg Uncertainty Principle and the forces governing, for example, the value of the fine-structure constant, which is a dimensionless expression relating Planck's action quantum, the speed of light and the unitary fundamental electric charge in physics. The synchronous motion of that vacuum charge seems to have a far reaching cosmic influence but superimposed on this there is the thermal and Fermi type motions once the effects spread into matter as such.

The point of relevance here is that when a spherical or cylindrical volume of the vacuum medium is affected by an electric field radial to the centre in that sphere or the central axis in the cylinder, then the harmonious jitter of the vacuum charge will lose its strict synchronism with that cosmic background. If it cannot, because it is phase-locked, then it must itself be displaced radially and at the same time its bodily distribution, meaning its lattice system, must develop a rotational motion about the centre or that central axis, albeit with some dependence upon orientation in space.

What this amounts to, so far as the subject invention is concerned, is that the quantum interactions through the space medium can bring into a focal system energy needed to set the vacuum medium in spin as governed by the need to cancel that radial electric field. There is then scope for wondering whether the switch-off or reversal of that radial electric field will unleash this energy and either result in it being shed to our material environment as excess heat or possibly becoming something that can be tapped in a controlled way to develop mechanical rotation or even electrical power directly.

So far as this subject patent application is concerned the objective is to provide apparatus by which to research the thermal theme, though the Applicant has already discovered evidence supporting what is said above in his research on electric motors.

Figure 5:
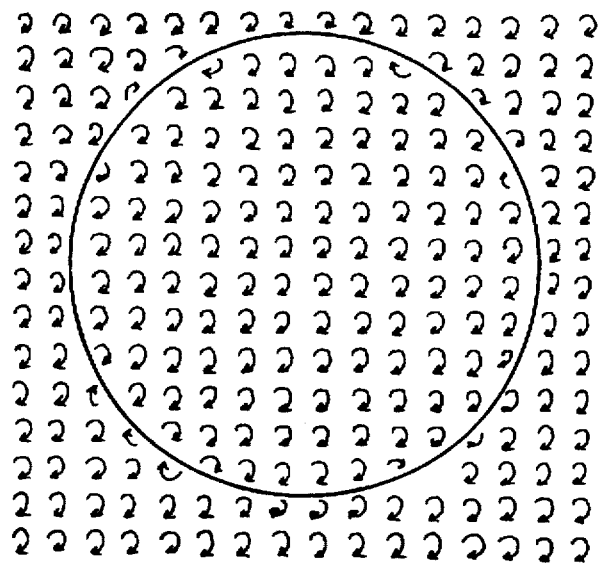
FIG. 5 portrays a quantum field spin system which will be discussed in explaining why the radial electric field in a conductor can produce an unusual physical phenomenon deemed to warrant research attention using the apparatus provided by this invention.

Though FIG. 5 is merely an outline depicting what has been said above about the vacuum state, it is of interest to consider what happens if a sphere comprising such a medium rotates bodily whilst those minor spins shown all stay in synchronism. As each is seated in charge neutralized by a background charge continuum, the larger motion with the sphere will cause them to move faster when furthest away in their minor orbits from the central axis of rotation of the sphere and slower when closer to that axis, assuming the sphere rotates in the same spin direction. This means a loss of synchronism instant by instant but it can be avoided by appropriate radial displacement of the system of vacuum charge in measure related to the angular speed of the sphere. This is a very fundamental process which assuredly underlies the reality of the physical world. One early example of the power of the theory involved here is disclosed by the Applicant and co-author Dr. D. M. Eagles in Physics Letters 41A, 423 (1972).

The essential point is that the setting up of a radial electric field within a conductive medium can induce a spin reaction in a coextensive spherical or cylindrical volume of the vacuum field medium and this involves both Maxwell-type electric charge displacement and the ingress of energy from the quantum underworld of space itself. That energy can remain hidden and be inaccessible unless we can devise ways of releasing it as by heat, but there is a way because this source of energy undoubtedly is the priming source for many natural phenomena on a cosmic scale.

Although this invention is not directed at the 'cold fusion' theme it will be understood from what has been explained above that the anomalous generation of heat claimed by those involved with 'cold fusion' research and the presence of a positive charge distribution within a metal conductor when heat and electric current flow combine in a certain way are suggestive. The existence of a positive ion charge balanced by vacuum charge displacement on a microfine scale implies the possibility of two positive ions easily merging owing to the aethereal nature of the negative charge that neutralizes their mutual force interactions.

This will explain why this patent application is linked by continuation with an original patent application filed shortly after the 'cold fusion' scenario was initiated.

Figure 8:
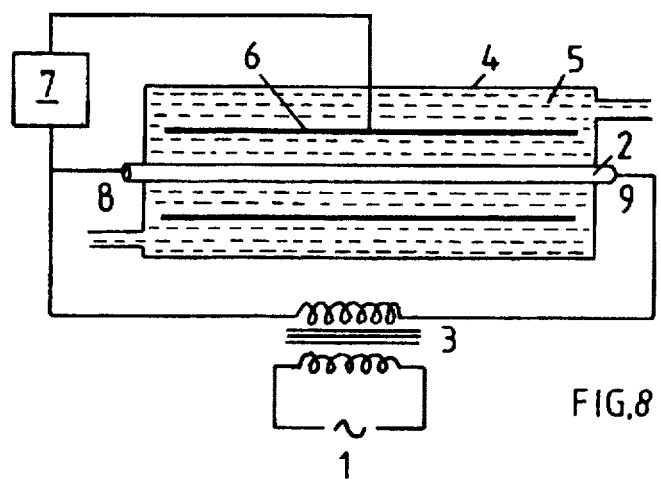
FIG. 8 shows the apparatus including an anode cathode circuit and an elongated cylindrical conductor separately powered by a.c. as disclosed in the parent patent applications to which this subject application is related by its continuation.

FIG. 8 is reproduced from that first application and it depicts an electrolytic cell in which an elongated conductor serves as a cathode enclosed within a cylindrical anode. The a.c. power source 1 supplies a high a.c. current through the cathode 2 by connection to the secondary winding of transformer 3. The cell housing 4 is filled with electrolyte 5 and the anode 6 is supplied with a low d.c. current from power source 7 which makes connection at terminal 8 to one end of the cathode 2. Since the a.c. output from the transformer is connected between terminal 8 and terminal 9 at the other end of the cathode, the d.c. and a.c. currents are confined to separate circuits. The electrical resistivity of the electrolyte, if of a typical salt solution, is about one ohm-cm compared with a resistivity of the metal cathode that is smaller by a factor of 100,000, so very little a.c. current will bypass the metal cathode by flow through the electrolyte. This means that a very strong current could flow through the cathode as a.c. to condition the cathode for its effect on any positive ions adsorbed into its metal body and the Applicant saw this as meritorious and of relevance.

However, here the subject is in no way concerned with the processes underlying what is termed 'cold fusion', but applies essentially to apparatus useful in research aimed at exploring heat energy anomalies.

Figure 9:
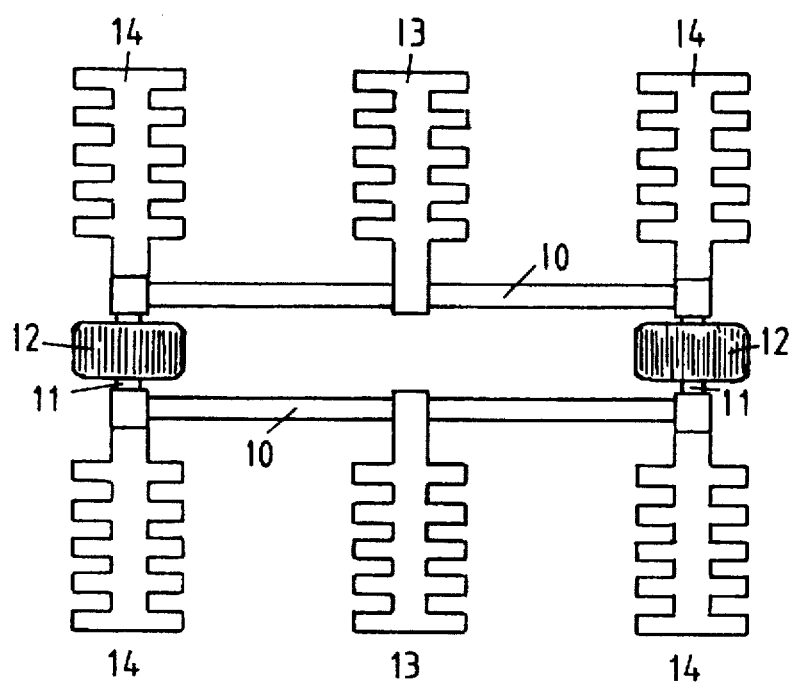
FIG. 9 shows an apparatus which represents a preferred embodiment of this invention, there being a simple elongated rectangular conductor loop circuit including as its main components two mutually parallel solid cylindrical metal conductors with connected heat sinks.

More specifically, the subject invention is concerned with the apparatus shown in typical form in FIG. 9.

Here there is emphasis on the structural feature of making the conductor circuit of minimal resistance, which requires a relatively thick conductor section elongated to give more operational length, but having in mind that parallel orientation of the conductors is essential for optimum effect.

There are two elongated solid cylindrical metal conductors 10, typically of nickel, which is ferromagnetic and has a high Nernst coefficient, and there are short bridging connecting conductor links 11 passing through the apertures in the two toroidal transformers 12. These have their primary windings connected to a source of a.c. power duly regulated electronically in a manner familiar to those skilled in the art of using power mosfet semiconductor devices. This source is not depicted in the drawings because it can take any form which assures a very low frequency input. The reason for this is that the very low resistance of the conductors 10 needs very little voltage to assure a current flow measured in hundreds of amps and owing to the thickness of the conductors, typically of one cm diameter, and the high magnetic permeability there is the need to avoid skin effects distorting the conduction properties. More important, however, there is the overriding need to allow time within the cyclic period for the radial electric field-dependent vacuum field spin condition to develop before reversing the action.

By keeping the frequency below 5 Hz, but preferably lower at less than 1 Hz, there is scope for sustaining a high current, notwithstanding the limit imposed by the transformer on the voltage-time integral which relates to the maximum magnetic flux condition of the transformer cores.

Figure 10:
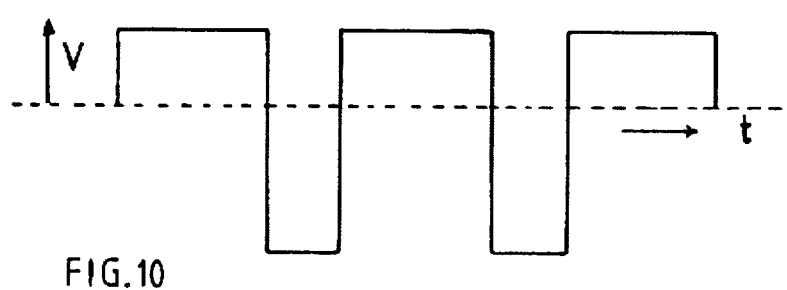
FIG. 10 shows the waveform profile of a typical voltage waveform used to power current flow cyclically through the conductor loop at very low frequency.

A quite low voltage of 5 volts applied to a toroidal transformer with a 60 Hz primary rating of 300 volts will operate at 1 Hz and by switching the voltage V of the power input electronically as a function of time t in the manner indicated in FIG. 10 the apparatus can be activated with a view to researching the possibile presence of anomalous heating.

Evenso, the apparatus cannot function unless there is some heat priming because, without the temperature gradient in the conductors 10, the current supplied by the transformer will not produce the radial electric field in those conductors.

The heat sinks 13 and 14 are therefore provided. To minimize temperature drops in connecting interfaces, whilst assuring the electrical isolation of the conductor loop, the heat sinks have fins with large areas and are exposed to heat exchange by air or gas flow directed onto those fins. To restrict heat flow to passage through the conductors they can be lagged with thermal insulation (not shown in the drawings) but the very high rate of heat conduction in a solid metal conductor can suffice but needs to be matched by a very high capacity for heat transfer at the heat sink surfaces.

Figure 6:
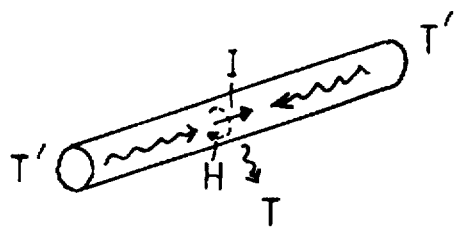
FIG. 6 shows a configuration of heat flow from the ends to the centre of a cylindrical rod carrying current and producing an internal circumferential magnetic field, with exit of heat laterally from its middle region.

In the apparatus described the heat sinks serve as the means for introducing heat priming, but should research using the apparatus result in anomalous heat generation the heat sinks become the means for utilizing that heat as a source of energy. FIG. 6 is self-explanatory in showing that heat inflow into both ends of a conductor from a source at temperature T' and egress from a mid region of the conductor at temperature T will develop a radial electric field provided a current I flows along the length of the conductor to develop a circumferential magnetic field H.

Figure 7:
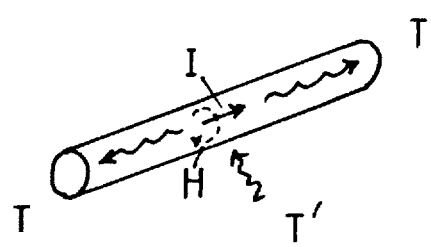
FIG. 7 shows a configuration alternative to that of FIG. 6 with the heat flows reversed.

Should the heat flow be reversed as shown in FIG. 7 then there will still be a radial electric field, given electrical current flow, but the direction of the current can affect the direction of the radial electric field. Should anomalous heat be generated within the conductor in research tests using the apparatus shown in FIG. 9, then the outflow of heat from the ends of the conductor will, with the current reversed at an increased value in a short time interval, give scope for testing a variety of control conditions using the apparatus.

In summary, therefore, the invention provides a new means for investigating energy conversion techniques based on thermoelectric action relying on the Nernst Effect, whilst bringing in sight the technological prospect of tapping a source of energy linked to the quantum underworld that regulates the physics of our environment.

This disclosure complements a parallel innovation connected with rotating machines in which the conductor spins and generates an internal radial electric field owing to the presence of a magnet axially mounted in the rotor system.

APPENDIX

A Commentary on the Physics of 'Cold Fusion'

Abstract

This commentary describes the circumstances of the Applicant's background interest in the subject of nuclear structure, particularly with regard to deuterons and proton creation, and a connected research background on anomalous electrodynamic properties associated with current flow in metal at room temperature.

It further explains why there is reason to expect the statistical incidence of physical processes associated with nuclear fusion to be different for action in metal and action in very hot plasma.

Furthermore, since any landmark invention in this field must probe unexplored territory which is not adequately mapped in the accepted and general state of the art, one must be prepared to give credence to physics which is new and unfamiliar. It is a recognized 'state of the art' fact that there are unsolved mysteries in physics, and physicists have at this time no way of denying this Applicant's contention that the mystery which particularly concerns what has come to known as 'cold fusion' is the role of the muon, the enigmatic mu-meson, in creating the proton and in promoting its decay.

The Fusion Criteria

In a very hot proton gas protons can combine to create heavier atomic nuclei. This is facilitated if there is something effectively neutralizing the charge repulsion between the protons. A proton or antiproton charge can become neutral if a beta particle of opposite polarity combines with it in some way to be seen as a neutron. Alternatively it is conceivable that in the very energetic field conditions that one can foresee, particularly in the presence of strong gravity fields, the field medium itself can be such as to overcome the mutual repulsion or the medium itself may become electrically polarized to provide a background that can serve as the neutralizing influence. In any event, the high energy physics of the scenario by which protons synthesise heavier forms of matter has to explain why hot fusion occurs and the picture just presented has to be very close to what has just been outlined.

Now, there is one important aspect here that tends to be overlooked. How do those protons get created in the first place? The scientific challenge here is not concerned with fusion but rather initial creation and the answer lies in finding the true explanation for what governs the mass of the proton. This is a theoretical exercise in which this Applicant has played an important and recognized part, because, although the world has not rushed into accepting the Applicant's explanation, it is a fact that the precise value of the proton-electron mass ratio of 1836.152 was deduced in terms of the mu-meson field. This derivation involved collaboration with Dr. D. M. Eagles of the then National Standards Laboratory in Australia. It was reported in the U.S.A. Institute of Physics journal Physics Today in 1984 (November issue, p. 15) and was mentioned in their 1985 update by the leading U.S. researchers who measure this quantity. See R. S. Van Dyck et al: International Journal of Mass Spectroscopy and Ion Processes, 66, (1985) pp. 327–337. They noted how remarkably close the theoretical value was to the one they measured and added 'This is even more curious when one notes that they [meaning this Applicant and Dr. Eagles] published this result several years before direct precision measurements of this ratio had begun.'

Given that the Applicant knows how protons are created from a mu-meson field and taking into account that physicists familiar with quantum electrodynamics know that the vacuum field is the seat of activity of electron and positron creation and that mu-mesons are otherwise known as 'heavy electrons', it needs little imagination then to suspect that Nature is trying to create protons continuously everywhere in space. Since we do not see such protons materializing before our eyes we must infer that they exist only very transiently after creation unless the field medium has surplus energy to be shed over and above its local equilibrium requirements.

This scenario of proton creation and annihilation is no less credible than the accepted scenario of electron-positron creation and annihilation or the equivalent mu-meson activity. We think the electron and the proton have an infinite lifetime because none has been measured, but the true reason for this is that it is impossible to measure the lifetime of something when it gets itself recreated virtually in the same place and immediately. Yet, we know that electrons can decay in association with positrons and we further know that electrons can tunnel through potential barriers with a $10^{-13}$ second lifetime, so physicists do need to get their picture of these events into proper context.

The proton and the electron are the only types of particle that exist in stable form, simply because they are recurrently regenerating as the primordial forms of matter, as such, in their respective charge polarity states.

Now, given this background knowledge of proton creation, it becomes easier to understand how an atomic nucleus might increment in its nucleon value and without needing an immensely hot background. If a proton were to be created in the very space already occupied by an atomic nucleus one can begin to understand how it might fuse with that nucleus and promote the emission of a beta particle. Almost all the transmutations that are listed in atomic tables, excluding what occurs in the heavy nuclei ranging from bismuth onwards, require emissions of beta particles. Beta particles are those electrons and positrons already mentioned. They are emitted by atomic nuclei. Yet atomic physicists have chosen to ignore their existence in atomic nuclei and have instead assumed that there are neutrons present to keep the mass balance. Here lies the very heart of the problem surrounding cold fusion. Neutrons are unstable. They are artifacts created when atoms break up. They are composites of beta particles and protons, but they do not exist as 'neutrons' in that atomic nucleus.

Accordingly, one must see the evidence of 'cold fusion' as evidence confirming this rather obvious proposition, namely that there are no neutrons in atomic nuclei. This is a case where discovery in the context of a technological advance, meaning 'invention', has given a new insight into basic physics and yet has led to the incredible contest by which the absence of the neutron hot fusion product has been regarded as disproving what is observed.

However, summarizing the position, Nature is constantly attempting to create protons everywhere, but generally does not succeed, because there is no energy to sustain the field equilibrium and so the pseudo-creations promptly decay. However, given the right conditions the statistical action can, even with the field equilibrium requirement, result in nuclear fusion because if the trigger threshold is reached it becomes energetically favorable for a proton elsewhere, but nearby, to decay to keep the vacuum field energy balance.

No doubt the reader will understand that, if a proton were to be created within an atomic nucleus, the event, if also accompanied with the expulsion of a positive beta particle, would leave that nucleus one nucleon heavier but with its charge unchanged. If, accompanying this event, a proton nearby, or a proton in a nearby deuteron, were to decay with its beta particle action, then some heat energy would be shed nearby. This becomes a very likely event, given that Nature most certainly does have a way of creating matter in proton form, provided (a) the overall mass energy of particles involved allows the reaction and (b) the close proximity of the particles is assured.

What, then, are the right conditions and how can this action be enhanced?

The answer is found by analogy with the hot fusion situation. We need to bring into very close relationship the two nuclei that are to fuse together. We can do this either by moving them at high speed, as by thermal excitation, or somehow assuring that, since they are positively charged, the field background has a negative electrical condition. The nuclei must further be stripped away from the satellite atomic electrons of the normal atomic form.

Now, before explaining how physics can assure this in the cold fusion work, it is appropriate to digress a little, in two ways.

Firstly, reference will be made to some reported evidence of cold fusion that antedates the Fleischmann-Pons activity. Secondly, the author will refer to his own experimental diversion at the time he made the invention which is the subject of the parent patent application based on the GB priority date of Apr. 15, 1989.

Cold Fusion in 1960

At pages 2-3 of the Journal of the British-American Scientific Research Association, Vol. XIII, No. 4, December 1990, there is an article by Edward Rietman entitled 'MOLECULAR CYCLOTRONS'. The article makes no reference to the 'cold fusion' theme but is concerned with transmutations at normal laboratory temperatures.

The following are quotations from that article:

'Digging through some old notes I found results for experiments on molecular cyclotrons. C. L. Kervran in 1960 published a book entitled TRANSMUTATIONS BIOLOGIQUES. His results were 'verified' by H. Komaki of Japan. In 1965 Kervran was nominated for the Nobel Prize.

These two workers observed an increase in metallic elements in seedlings germinating in pure water. Specifically they observed transmutations of the type

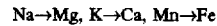

In each of these cases a proton was reported to be absorbed by the nuclide of lower atomic number to form the next higher element.

S. Goldfine wrote a report in 1978 discussing how such reactions might take place in biological organisms.

It is well known that ATP in the mitochondria is a key molecular component in biochemical energy production. The mitochondria also contains Na, Mg, K, Ca, Mn and Fe ions. Goldfine suggested that the periodic field of an Mg-ATP crystal lattice will cause periodic fluctuations on the wave function of the trapped electron . . . there is a flow of electrons in the Mg-ATP caused by the many reactions occurring in the mitochondria . . . Goldfine continued to suggest that the small crystallites of Mg-ATP in the mitochondria act as molecular cyclotrons to accelerate protons and produce reactions of the type:

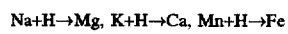

To cast some light on this subject I spent months attempting to grow crystals of Mg-ATP complex for study in X-ray diffraction. I never succeeded in even obtaining a powdered sample. I concluded that the Mg-ATP complex exists only in an aqueous environment . . . '

From the above quotation one can see that here was a version of cold fusion presented from a background that is in the field of biological organisms.

One may further infer that living organisms are subject to nuclear transmutations that are accentuated where crystallites involve metallic elements in an aqueous environment, and this suggests that, in denying the realities of cold fusion, one is turning away from something that may have relevance to cancer research, inasmuch as those transmutations might well have consequences to health.

Bearing in mind that there is evidence to show that magnetic fields also have an effect on biological activity that is problematic from the physics viewpoint, it is appropriate to investigate the electrodynamics of heavy ions, whether moving in water, in metal or in a plasma. The point of vital importance that warrants attention is that all the teaching concerning electrodynamic actions is based on empirical studies involving electron currents. Electrons are classified as leptons and there are some very sound reasons for distinguishing their electrodynamic properties from those of hadtonic matter.

The Applicant's Electrodynamic Research

There are long-accepted but unresolved anomalies concerning the anomalously very high forces exerted on heavy ions in a cold cathode discharge. In researching this subject the Applicant has established that the forces exerted on a heavy ion owing to its electrodynamic interaction with an electron are, in theory, enhanced by a factor equal to the ion-electron mass ratio.

This theory leads to a breach of the law that specifies balance of action and reaction, which means that energy is being being exchanged with the field medium in which the electromagnetic reference frame is seated. The effective electromagnetic reference frame has a structure, as if it is formed by a fluid crystal lattice which, on a local scale, can adapt or maybe govern the shell structure of an atomic nucleus. Thus, normally, the motion of atoms and even ions in a gas or a solution will not evidence the anomalous electrodynamic effects, simply because they do not move relative to the local electromagnetic reference frame, meaning that, as far as concerns translational motion, the electrons present are the only active participant electrodynamically.

It is, however, quite a different situation when we consider a proton or a deuteron as a free ion inside the crystal host lattice of a metallic form, because there can only be one electromagnetic reference frame effective at any location in that metal. Therefore, a proton that is within a host crystal, and is free to move through it, will be seen as moving relative to the electromagnetic reference frame and then it can contribute to anomalous electrodynamic effects.

These conditions were the subject of the Applicant's research as a Visiting Senior Research Fellow at the University of Southampton in England 1983 onwards. The Applicant had written on the subject of the proton, the deuteron and the neutron, pursuing the theme that no neutrons exist inside the deuteron and stressing that atomic nuclei are composites of beta particles and protons or antiprotons. This work was all published before 1989.

The anomalous electrodynamic forces that exist in the heavy ion/electron interaction imply a hidden source of energy and so of heat but the Applicant's research was aimed essentially at proving the modified law of electrodynamics dictated by that research. Certainly, whilst the ability to accelerate heavy ions by drawing on a hidden source of field energy was one of the Applicant's pursuits, at no time had the Applicant contemplated the prospect of a fusion reaction of the kind implied by Fleischmann and Pons.

Nevertheless, as soon as that latter work was reported, the research knowledge arising from the author's investigations was seen as relevant in the onward exploration of the excess heat phenomenon.

The Applicant was not only interested because of the excess energy aspect. There was the no-neutron feature and the fact that the process involved ion migration through water. There was the fact that the deuteron was the primary agent and this Applicant had shown, from the theory of the deuteron mass and its magnetic moment, that deuterons undergo cyclic changes of state and in the state which prevails for one seventh of the time, the deuteron has a neutral core, having transiently shed a beta particle. More than this, however, the author had become involved at the time with two inventions, one of which later became the subject of a U.S. Patent (No. 5,065,085) and these involved anomalous energy activity in a thermoelectric context which bears upon the cold fusion issue.

The other, lesser important, of these inventions was concerned with 'warm' superconductivity. The Applicant's research had suggested that substances having certain molecular mass forms are adapted to absorb impact by conduction electrons in such a way that the change of inductive energy accompanying the collision is conserved until the resulting EMF changes can impart the energy to another electron. This meant that the thermal energy of a heavy ion in the substance could be reduced to feed the normal resistance loss associated with the current. This was, therefore, a process by which anomalous heat energy activity was involved in electrodynamic interactions between heavy ions and electrons.

The more important invention of the two just mentioned was concerned with the anomalous behaviour of a thermoelectric interface between two metals when subjected to a strong magnetic field in a rather special conductor configuration. Here, the Nernst Effect operates to cause heat carried by electrons in a metal to be converted into an electric potential energy by the ordering action of a transversely directed magnetic field.

The essential requirement for the action of the Nernst Effect is that there is a temperature gradient in the metal and, given such a temperature gradient, and the magnetic field, there will then be an electric potential gradient set up within the metal. Now, a potential gradient inside a metal conductor implies that there is inside the body of the metal a distribution of electric charge not neutralized by normal metallic conduction. The polarity of that charge is determined by the direction of the thermal gradient and the orientation of the magnetic field. It can be negative or positive by choice in the design of the apparatus used.

Besides this, the Applicant knew that the flow of a strong current through a metal conductor will promote what is known as the pinch effect in which electrodynamic forces act on the negative electron charge carriers to pinch them inwards and so set up an excess negative charge distribution inside the metal conductor.

This, plus the additional feature that a strong current flow through a metal conductor that is populated by free deuterons will promote a migration of deuterons that will bring them more frequently into near collision, all militated in favour of an invention proposing the provision of a supplementary high current closed circuit through the cathode of a cold fusion cell. That, indeed, became the subject of the patent application which the Applicant filed in U.K. on Apr. 15, 1989, this being the priority application relied upon in the U.S. Patent Application under petition.

The Applicant, therefore, had reason to believe that the work on cold fusion would progress if the auxiliary current activation circuit were to be used.

However, in the event, the pioneer work of Fleischmann and Ports became the subject of such criticism that there was no prospect of getting R & D funding to take the subject invention forward and one is confronted with a chicken and egg scenario where disbelief of cold fusion as a scientific possibility stands in the way of securing patent grant and the doubts about securing a patent stands in the way of finding sponsorship for the development.

The Fusion Criteria Reexamined

There are three criteria that need to be satisfied simultaneously to promote and enhance the cold fusion reaction of deuterons.

Firstly, there is the background incidence of the virtual mu-meson field which is trying everywhere to create protons. This is a natural activity that cannot be controlled. It is a statistical effect, but one can calculate the probability governing proton creation fluctuations in a given volume of cathode material. See comments below.

Secondly, there is the need to bring the deuteron partner in the fusion process into close proximity with the target deuteron. In hot fusion reactions this is achieved by the motion associated with thermal activity. In cold fusion it is achieved by adsorbing deuterons into a host metal in which they become separate from their satellite electrons and by concentrating the loading by the deuteron population.

Thirdly, as with the creation of stars and by hydrogen fusion, there is the need to provide the field which pulls the deuterons together in spite of their mutual repulsion. In cold fusion this means the provision of a neutralizing negative charge distribution within the metal body of host metal. This requires strong electron current surges resulting in heat concentrations which set up temperature gradients in company with transverse magnetic fields. However, the structural form of the host metal in relation to the current channel, the magnetic field effect and the heat conduction path require a mutually orthogonal geometry to provide an optimum action.

Note that the surplus negative charge may result in a charge density that is quite small in relation to the positive charge of the deuteron population but every unit of charge is seated in a discrete electron and a single electron which can upset the normal charge balance of deuterons and free conduction electrons can nucleate a pair of deuterons.

Then, the creation of a proton in one deuteron accompanied by the demise of a proton in the other will convert the two deuterons into a tritium nucleus and free a proton with a beta particle transferring between the two. Alternatively one deuteron will convert into helium 3 and the proton released will be in company with a beta minus particle.

The onward reactions involving neutrons that are observed with hot fusion processes need not occur if the events involved are triggered naturally by the mu-meson activity in trying to create protons rather than by neutron bombardment.

The Proton Creation Probability

This probability of proton creation is a calculable quantity in terms of the vacuum lattice theory which the author developed in the 1960s and published in 1972/1975. It is, however, also evident empirically from the action of proton creation in promoting the decay of tritium. The triton nucleus comprises what is effectively a two part structure linked together by a nuclear bond with one part of the structure seated at a charge site in the vacuum lattice. It is this site that is the target for the mu-meson attack by which the proton form is created. When the proton does form at such a site and that tritium nucleus is present, the two-nucleon part converts to helium 3 and the single nucleon part decays to return the proton energy to the vacuum and sheds a beta minus particle. This reaction occurs with a release of a quite small amount of heat energy, namely 17.9 kev and with a 12.2 year lifetime. Accordingly, since the deuteron presumably has an affinity for the lattice sites in the vacuum, it is reasonable to expect the deuteron cold fusion reaction to occur with a similar incidence rate. The two deuterons will release 4 Mev in creating a proton and a triton and this will be the main source of heat followed by the triton converting to helium 3 and the onward heat evolution as helium 4 develops. The 12.2 year reaction probability, given a sufficient concentration of deuterons, could well accounts for any excess heat that can truly be said to involve a 'cold fusion' process.

It follows, therefore, that the primary technological problem of assuring that heat is generated in a cold fusion cell is that of bringing about the right concentration of deuterons in the host metal. This is not to be measured in number of deuterons per unit volume but in the number of deuterons that have a separation distance less than a certain critical threshold. That threshold distance can best be determined empirically but, whilst it can be penetrated by deuterons in a spurious activity where temperature gradients and field effects combine to be effective coincidentally, it is better if the Nernst Effect is harnessed more directly so as to create the negative charge background in a controlled way.

This, indeed, is the route by which the invention, the subject of the patent application Ser. No. 07/480,816 can develop, but one feels that the orthodox scientific establishment bias, which denies that 'cold fusion' can be a reality, is so determined to obstruct progress that the outcome will be to the detriment of interests in the United States.

This Appendix commentary applies essentially to the substantive disclosure in the parent patent application Ser. No. 07/480,816 and is intended to be one of historical and public record besides eventually proving of relevance to the subject invention depending upon the outcome of events in the development of 'cold fusion'.

I claim:

1. Thermoelectric energy conversion apparatus comprising (a) mutually parallel elongated cylindrical metal conductors disposed side by side with short bridging connecting conductor links at their ends so as to form a closed circuital loop, of which the elongated conductor sections are composed of nickel and the links are of any normal conductor material better suited to assuring an overall circuit of low resistance able to carry a current in excess of 100 amps, (b) a source of electrical input power and circuit control means for regulating the power delivered by the source to develop an a.c. voltage at a frequency less than 5 Hz, (c) an electrical transformer disposed between adjacent ends of the elongated conductors, the transformer having a primary winding connected to receive the power delivered and transform it into current in said metal conductors which are arranged to form the circuital loop as a secondary winding on the transformer, the connecting conductor link at the transformer position passing through the ferromagnetic core aperture so as to constitute a segment of the secondary winding, and (d) two sets of heat sinks in thermal contact with the conductors at different positions along their length, with associated thermal transfer means for delivering and deploying heat, one set of heat sinks serving as a heat input source and one set serving as a heat output source, the a.c. current induced in the closed circuital loop being confined to passage through the elongated cylindrical metal conductors so as to develop a circumferential magnetic field about the conductor axis which interacts with heat flow along that axis to develop in turn an electric field within the conductor directed radially with respect to that axis.

2. Thermoelectric energy conversion apparatus according to claim 1, in which there are only two elongated metal conductors connected by two bridging connecting conductor links to form a loop which is a single turn secondary winding on said transformer.

3. Thermoelectric energy conversion apparatus according to claim 1 or claim 2, wherein the circuit control means for regulating the power delivered by the source to develop an a.c. voltage at a frequency less than 5 Hz includes electronic power control circuit components which control the voltage waveform supplied to the transformer in an asymmetrical manner in which the voltage is lower and of longer duration in one polarity direction and higher but of shorter duration in the opposite polarity direction.

4. Apparatus according to claim 2, wherein there are two transformers aiding one another in powering the current flow in the conductor loop, these being toroidal transformers, one having a said bridging connecting conductor link passing through the central aperture of its toroidal core and the other having the other bridging connecting conductor link similarly passing through its central toroidial core aperture.

5. Thermoelectric energy conversion apparatus according to claim 1, in which the elongated metal conductors are all of equal diameter and so equal cross-sectional area.

6. Apparatus according to claim 1, wherein the elongated cylindrical metal conductors are enclosed in thermal insulation along their lengths between the heat sinks in order to confine heat flow to passage in an axial direction along the conductors.

* * * * *